June 8, 1965 S. A. CLAYPOOLE Re. 25,791

COMPOSITE ARTICLE AND METHOD

Original Filed Feb. 1, 1956 5 Sheets-Sheet 1

INVENTOR.
STEWART A. CLAYPOOLE
BY Clarence R. Patty, Jr.
ATTORNEY

COMPOSITE ARTICLE AND METHOD

Original Filed Feb. 1, 1956 5 Sheets-Sheet 2

INVENTOR.
STEWART A. CLAYPOOLE
BY Clarence R. Patty, Jr.
ATTORNEY.

INVENTOR.
STEWART A. CLAYPOOLE
BY Clarence R. Patty, Jr.
ATTORNEY

COMPOSITE ARTICLE AND METHOD

Original Filed Feb. 1, 1956 5 Sheets-Sheet 4

INVENTOR.
STEWART A. CLAYPOOLE
BY Clarence R. Patty, Jr.
ATTORNEY

INVENTOR.
STEWART A. CLAYPOOLE
BY
Clarence R. Patty, Jr.
ATTORNEY

United States Patent Office

Re. 25,791
Reissued June 8, 1965

25,791
COMPOSITE ARTICLE AND METHOD

Stewart A. Claypoole, Painted Post, N.Y., assignor to Corning Glass Works, Corning, N.Y., a corporation of New York Original No. 2,889,952, dated June 9, 1959, Ser. No. 562,763, Feb. 1, 1956. Application for reissue Sept. 19, 1960, Ser. No. 57,091
21 Claims. (Cl. 220—2.1)

Figure 1:
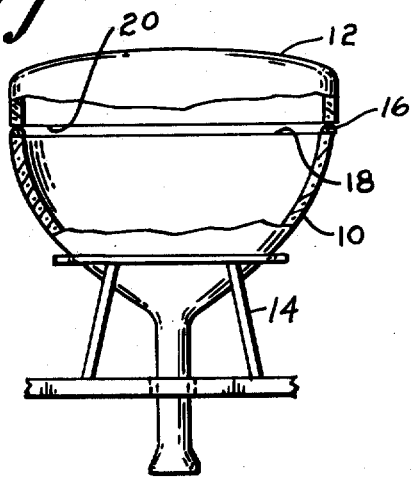

Matter enclosed in heavy brackets [ ] appears in the original patent but forms no part of this reissue specification; matter printed in italics indicates the additions made by reissue.

This invention relates to the fabrication of composite articles by joining together, with an intermediate sealing glass, parts preformed from glass, metals, or ceramics. The invention is particularly related to the fabrication of composite articles which may subsequently be subjected to a mechanical strain or bending moment in the sealing area, especially while the article is subjected to elevated temperatures which may approximate or even exceed that at which the seal is formed. A specific embodiment of the invention relates to the sealing together of glass parts to form a cathode ray tube.

A simple and widely used method of making glass-to-glass and glass-to-metal seals involves heating the sealing areas to soften the glass involved and then bringing the parts together to form a direct union or seal. This method can only be used, however, when the materials involved have closely matched expansion characteristics. Further, distortion of the glass part is inherent in the process and necessitates either highly skilled glass workers or complex machinery to insure formation of a satisfactory seal with proper alignment of the parts. A serious problem also arises when one of the parts must, prior to formation of the seal, be provided with an auxiliary feature such as a phosphor coating or a metallic film, shield, or electrical contact, which may be severely damaged by the intense heat involved or by exposure to the heat source itself. This latter difficulty is particularly acute in the production of cathode ray tubes for color television receivers since such tubes require that heat-sensitive coatings be applied on the panel as well as sensitive masks and shields mounted in the vicinity of the seal between the funnel and panel portions of the tube prior to making such seal.

In order to avoid these various problems, it has been proposed in U.S. Patent No. 2,642,633 issued to R. H. Dalton, to join preformed glass parts with an intermediate soft sealing glass which has a softening point sufficiently below that of the glass being sealed to permit formation of a seal without any distorting flow of the preformed parts. While this procedure has been successful in dispensing with the need for intense direct heat in sealing operations, the method has not been entirely satisfactory in other respects. In particular, severe losses have been encountered during the bakeout step when soft glasses have been used in sealing cathode ray and other electronic tube parts.

In producing electronic discharge tubes, it is conventional to bake out the tube, that is evacuate the tube while subjecting it to an elevated temperature on the order of 400 to 500° C. or even higher to remove absorbed gases. The bakeout operation may be carried out concurrent with sealing operations or, alternatively, may constitute a separate, subsequent step. In any event, soft sealing glasses tend to become soft and flow at the temperatures involved and, under the influence of a pressure difference, may result in slippage between the sealed components unless considerable care is exercised in supporting the assembly. The soft glass also tends to bubble or foam under vacuum, thus producing a fragile and unsightly seal. During evacuation the soft glass tends to be expelled or squeezed from between the harder parts thus permitting irregularities on the harder sealing surfaces to meet and cause point loading, a condition conducive to local strains and fracture. Heretofore this could only be avoided by an expensive grinding procedure to provide smooth sealing surfaces on the parts.

It has also been found that non-symmetrical parts such as rectangular funnels and panels used in forming cathode ray tubes have a tendency to flex under bakeout conditions. Such flexures are frozen in when the glass is cooled thus creating stresses which frequently result in the formation of cracks as the vacuum is released and normal pressure restored in a bulb preliminary to either additional tube processing operations or salvage of defective tubes.

Furthermore, experience has shown that seals made in this manner tend to be quite sensitive to heat shock, that is rapid temperature changes while a sealed article is either being cooled from the sealing temperature or subsequently reheated. This has unduly lengthened the sealing time in many instances and has correspondingly slowed down subsequent operations involving thermal cycling. The time factor alone then has been a major deterrent to wider adoption of the low temperature sealing technique with soft sealing glasses.

It is readily apparent that an improved sealing method is required for the production of color television tubes and other electronic discharge tubes as well as other composite articles and it is one of the objects of the present invention to provide such improved method. It is a further object to produce a composite article having a glass seal which is mechanically strong, vacuum tight, sufficiently resistant to heat shock to permit rapid cooling or reheating, and capable of being exhausted and baked out at the required elevated temperatures without flexure or movement of the parts, or detrimental change in the sealing glass.

Quite surprisingly, I have now found that these objects can be attained and the previous sealing problems laregly avoided or minimized by forming a devitrified glass seal between preformed parts. I have further found that it is possible to form a seal with a soft sealing glass in the manner described in the Dalton patent and to thereafter cause the sealing glass to devitrify thus producing the desired devitrified glass seal.

Heretofore devitrification has been assumed to be a highly undesirable glass characteristic and glasses exhibiting such devitrification tendencies have been generally avoided. Where, however, an otherwise highly desirable glass was found only slightly deficient in this respect, considerable effort has often been expended to devise composition controls and special melting and working conditions to insure production of undevitrified glass. The term devitrification is used here in its conventional sense to mean a crystallization of glass wherein at least a part of the glass is converted, or devitrified, to a crystalline phase, that is a rigid crystalline skeleton which may be associated with a glassy matrix and wherein thermal and other material characteristics or properties, such as viscosity and expansion, differ from those of the parent glass and are substantially determined by the crystalline phase.

The method of the present invention then resides in forming a composite article by assembling two preformed bodies with an undevitrified sealing glass interposed between the sealing surfaces of such bodies, heating the assembly to a predetermined sealing temperature to form a seal and, subsequent to the formation of a seal, heating the sealing glass at its devitrification temperature for a sufficient time to cause devitrification of the sealing glass and thereafter cooling the article. The invention further contemplates composite articles formed in this manner.

The following compositions, expressed in percent by weight, illustrate lead-zinc-borate type glasses which have been found particularly suitable in making seals of the present type at temperatures on the order of 420–450° C., and between glasses and other materials having an expansion on the order of $80–120\times10^{-7}$ per ° C.:

| | I | II | III | IV | V | VI | VII |
|---|---|---|---|---|---|---|---|
| PbO | 77.5 | 77.5 | 80 | 77.5 | 71.5 | 75 | 74.5 |
| ZnO | 10 | 10 | 10 | 10 | 15 | 10 | 10 |
| $B_2O_3$ | 7.5 | 9 | 6.5 | 8.5 | 7.5 | 10 | 8 |
| $Al_2O_3$ | 2.5 | 1 | 1 | 2.5 | 3.5 | 2 | 1 |
| $SiO_2$ | 2.5 | 2.5 | 2.5 | 1.5 | 2.5 | 3 | 1 |
| CuO | ------ | ------ | ------ | ------ | ------ | ------ | 5 |
| $Sb_2O_3$ | ------ | ------ | ------ | ------ | ------ | ------ | 0.5 |

*In the accompanying diagrammatic illustration of the above compositions (FIG. 11a), RO signifies the total content of divalent metal oxides in a composition, that is $PbO+ZnO+CuO$. Correspondingly, $R_2O_3$ signifies the total content of trivalent metal oxides, that is $B_2O_3+Al_2O_3+Sb_2O_3$.*

While these glasses are particularly effective in making devitrified glass seals under the conditions stated, it will be appreciated that the invention may also be practiced with a wide variety of other glasses and under other conditions. The glass selected for making a given seal will depend on various factors including the properties of the materials being sealed, such as their expansion characteristics and softening point, the specified sealing conditions, particularly the temperature at which the seal is to be made or the permissible range of temperatures, and somewhat on the nature of the seal itself. With these factors established, one skilled in the glass art can then select or compound a semi-stable sealing glass and determine the suitability of the glass with the aid of sealing tests such as described subsequently.

Devitrification of a soft sealing glass tends to form a relatively rigid crystalline skeleton or phase usually within a glassy matrix. The formation of this crystallized or partially crystallized material by divitrification produces, in situ, a sealing material that is substantially harder or more viscous than the original sealing glass. In fact the devitrified sealing material may even be more viscous or, conversely, less subject to deforming flow at an elevated temperature, than the parts being sealed together. It has been observed that the expansion characteristics of a devitrified soft sealing glass also tend to differ markedly from those of the parent glass. This in turn is thought to impart the much greater resistance to heat shock attainable with devitrified seal. It is believed then that, once a sealing glass is substantially devitrified, its thermal characteristics become primarily dependent on the crystalline or devitrified phase, with any glassy phase having only a minor influence. Since it is rather difficult to determine when the devitrification process is complete, and since complete devitrification is not generally necessary to present purposes, it will be understood that the present invention contemplates any degree of devitrification which produces a harder or more viscous material, exhibiting a characteristic change in expansion properties.

Successful practice of the present invention requires what might be termed a semi-stable, soft sealing glass. That is to say the glass must behave like prior, stable, soft sealing glasses until a good seal is effected. A good seal between parts requires that the sealing glass be relatively soft and fluid at the sealing temperature so that it can flow over and completely wet the sealing surfaces of the preformed parts as well as completely fill the space between such surfaces. If the glass is too stiff, reentrant angles, folds and the like occur and the seal is mechanically and thermally weak. It is apparent then that the glass must be one which does not appreciably devitrify either during melting or in reheating prior to formation of a seal. Further, the glass should have a softening point at least 40° C. below the selected sealing temperature and preferably on the order of 70–80° C. below.

It is quite desirable, however, that the sealing glass devitrify as rapidly as possible once a proper seal is formed. Preferably glass devitrification is initiated at the selected sealing temperature thus permitting the assembly to be raised to the sealing temperature and then held at that temperature for a short time, that is on the order of a few minutes to an hour or so, while devitrification of the glass occurs. Alternatively, when devitrification occurs too slowly, or fails to occur, at an established or otherwise suitable sealing temperature, the sealing glass may be raised to a somewhat higher temperature to induce devitrification providing the higher temperatures are not detrimental to the assembly being sealed.

In forming a fusion weld or seal between two glass parts it is, as previously indicated, highly desirable to conduct the sealing operation at a sufficiently low temperature that no distortion occurs in the glass parts being sealed. To this end a soft sealing glass, in an undevitrified state, should have a sufficiently low softening temperature that it will melt and flow at temperatures considerably below the softening temperature of the glass parts being sealed. Preferably sealing operations are carried out at temperatures not appreciably exceeding the annealing temperature of the parts being sealed, thus requiring sealing glasses having a softening point below the annealing temperature of the glass being sealed.

Expansion match over a given temperature range with the parts being sealed has been a primary criterion in selecting prior stable sealing glasses. For present purposes, however, the expansion of the parent sealing glass, that is the glass in its normal undevitrified state, is of relatively less importance, since the physical properties of the glass in its devitrified state determine the amount and nature of stress developed in the seal and these properties tend to be quite different from those of the parent glass. While physical properties of devitrified glasses, particularly expansion data, can be measured by conventional methods, the obtaining of accurate values by such means is rather difficult and requires considerable care in preparing and handling of test samples. For this reason it is often more convenient to rely on stress values to evaluate glasses for the present method. As described later, stress values can be calculated from birefringence changes observed while an actual glass seal is being thermally cycled and will correspond to expansion data obtained in conventional manner. While ideally a sealing glass should match the materials being sealed, this is generally impractical and it has been found desirable to produce compressive stresses in a seal in order to avoid developing substantial tensile stresses during thermal cycling of the completed seal.

In preparing a parent sealing glass for the present purpose considerable care should be exercised during mixing and melting of the batch to avoid contamination of the glass and to insure a uniform composition throughout the melt, since devitrification rates may be quite sensitive to even minor composition variations. After the glass melt is cooled, it is reduced to powdered form preferably being sufficiently fine to pass through a standard 100-mesh screen. The powdered glass may then be mixed with a conventional organic binder and vehicle to form a suspension or slurry for application to a sealing surface. Any organic materials used should be capable of completely burning out or volatilizing well below the sealing temperature of the glass and a solution of 1–3% nitrocellulose in amyl-acetate has been found particularly effective. The ratio of glass to vehicle and binder will depend to a large extent on the manner of application, the viscosity of the suspension being adjusted to provide the desired thickness and coverage of glass powder on the sealing surface.

The suspension may be applied in various manners. One convenient procedure involves flowing it onto the sealing surface of a preformed body from a constricted tubular type of reservoir to form a ring or strip, just covering the sealing surface. For some purposes, however, it has been found preferable to dip the sealing surface of the preformed body into a pool of the suspended sealing glass. When this procedure is used it is convenient to coat beyond the sealing surface onto the article wall. The dipping procedure has been found to provide better seal fillets as well as allow somewhat greater latitude in sealing temperatures. In order to provide a heavier sealing glass layer it may be desirable to successively dip and dry the layer of glass thus deposited two or more times. In order to properly apportion the sealing glass, subsequent dips may be to a lesser depth than the initial one. Alternatively the suspension may be applied to the sealing surface by other means such as spraying.

Where the coated articles must be handled or stored, or where other operations, such as panel coating or mounting of parts prior to sealing, must be performed, the fragility and exposed condition of the deposited sealing glass may present a problem. I have found that the problem thus occasioned can be largely avoided by glazing, that is by fusing or at least partially fusing, the sealing glass prior to the actual sealing operation. In utilizing such preliminary glazing, it is imperative to avoid initiating devitrification since otherwise the sealing glass may be sufficiently altered to interfere with proper seal formation subsequently. The maximum permissible glazing temperature will depend then in large measure on the ease with which the glass divitrifies. While some glasses can actually be glazed at the subsequent sealing temperature, it is generally desirable to employ lower glazing temperatures which may be on the order of 50° C. below the sealing temperature.

While devitrification is known to occur in molten bodies of glass or in reheated solid glass bodies, it tends to occur in a rather unpredictable manner that is not conducive to the controlled type of devitrification desirable for sealing purposes. I have found, however, that when the glass is first reduced to powder form a reasonably definite and predictable temperature of devitrification can be ascertained and a suitable thermal sealing cycle established. For this reason it is preferable to use a glass suspension procedure of application as described above. It is not known what effect the glass powder has, since it is reheated to a soft, flowable mass before any visible evidence of devitrification becomes apparent. However, it is thought that in some manner fusing of the powder leaves nucleation centers within the glass mass from which devitrification can proceed.

After the sealing glass is applied to the sealing surface it is then heated to a predetermined sealing temperature with either an adequate break in the heating cycle, or at a sufficiently slow rate, to permit complete burn-out of organic binder where such is used. Once the assembly has been heated to the sealing temperature and the sealing glass caused to wet the sealing surfaces and flow into the desired seal configuration, the sealing glass is then held at its devitrification temperature, which preferably corresponds to the sealing temperature, for a sufficient time to accomplish the desired devitrification and thereafter cooled to room temperature.

Figure 3:
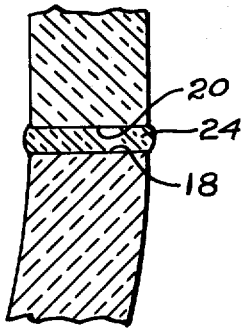
Figure 2:
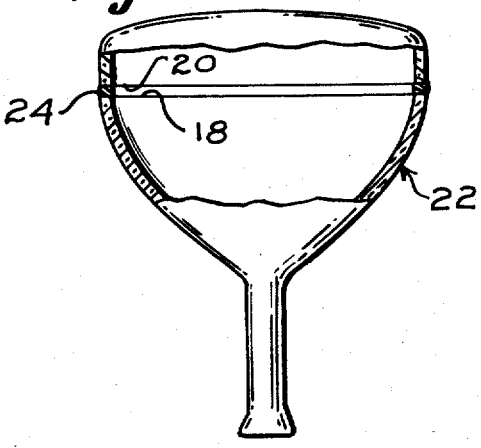
Figure 4:
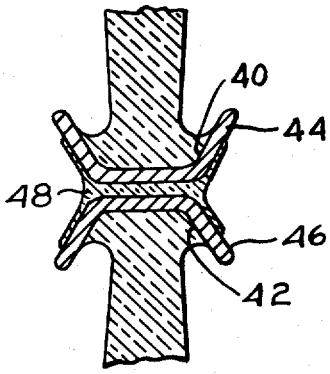
Figure 9:
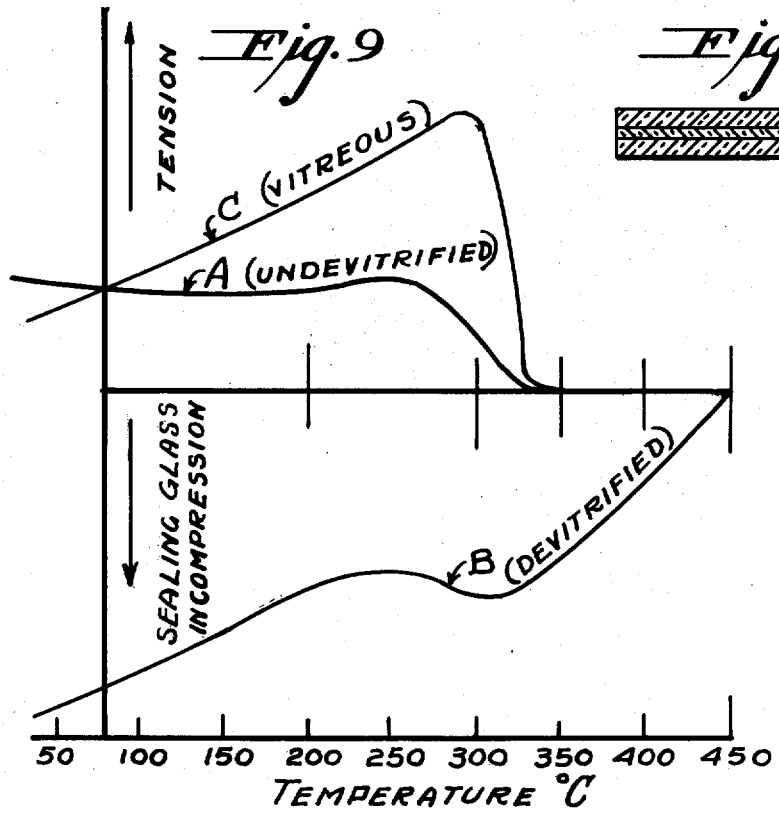
Figure 10:
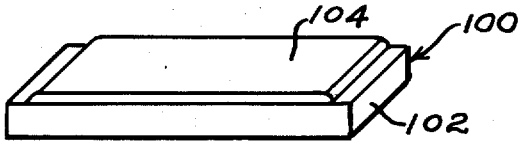
Figure 11:
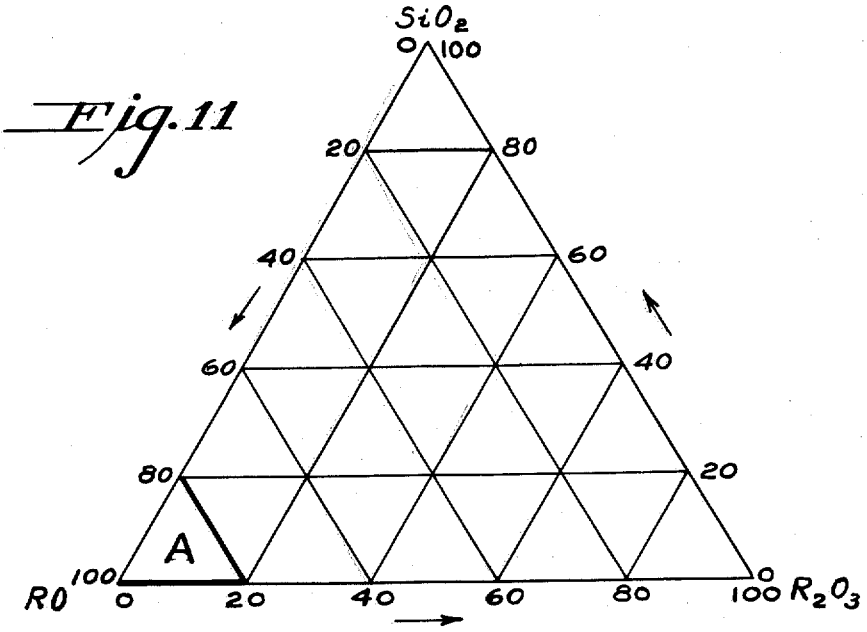
Figure 11A:
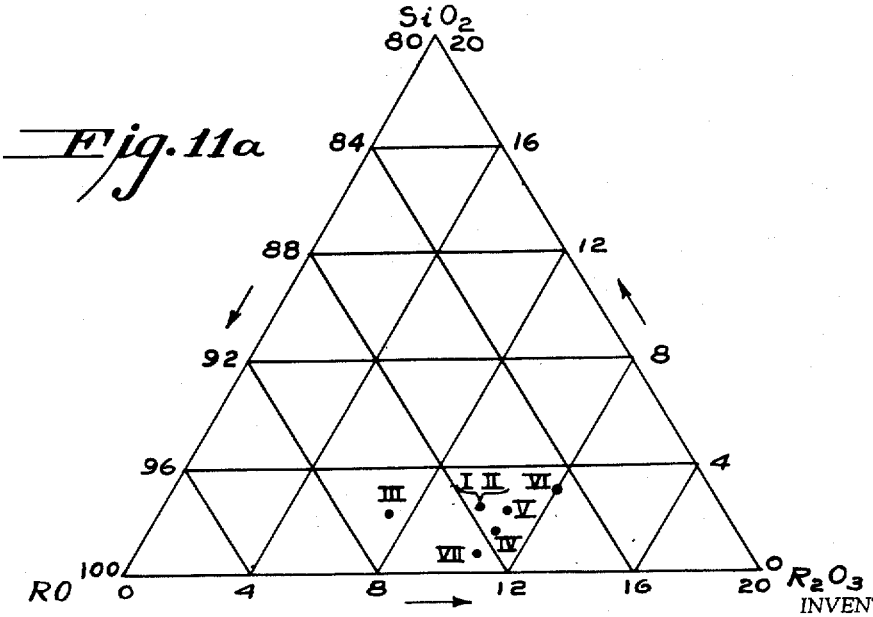
Figure 12:
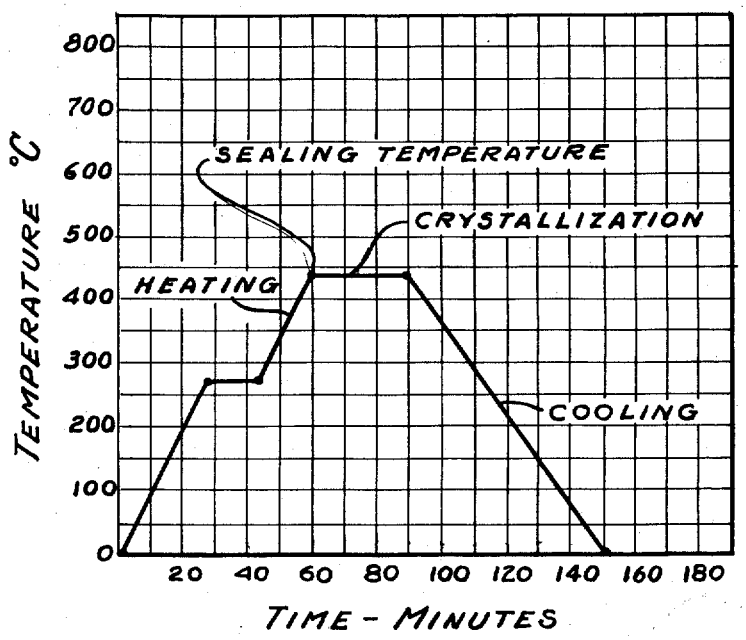

By way of further illustrating the present invention reference is made to the accompanying drawings in which FIG. 1 is an elevation partly in section of cathode ray tube parts assembled preparatory to making a seal in accordance with the present invention, FIG. 2 is an elevation partly in section of a cathode ray tube sealed in accordance with the invention, FIG. 3 is an enlarged sectional view of the seal of FIG. 2, FIG. 4 is also an enlarged sectional view showing a modified form of cathode ray tube seal, FIGS. 5–8 are fragmentary cross-sectional views illustrating additional general types of seals made in accordance with this invention, FIG. 9 is a graphic illustration comparing the expansion characteristics of devitrified and undevitrified soft sealing glasses [and], FIG. 10 illustrates a test sealing sample used in determining the data plotted in FIG. 9, *FIGS. 11 and 11a, the latter being an enlarged triangular segment of the former, are ternary composition diagrams illustrating graphically the seven lead-zinc-borate glass compositions previously set forth numerically, and FIG. 12 is a time-temperature chart illustrating a sealing cycle in accordance with the invention.*

The assembly of FIG. 1 includes a cathode ray tube funnel 10 and panel 12 both preformed or molded in conventional manner. In preparation for sealing these parts together funnel 10 is inverted and positioned in a supporting frame 14 with panel 12 in vertical alignment therewith. Funnel 10 has a continuous ring or bead of sealing glass 16 deposited on its sealing surface 18 while sealing surface 20 of panel 12 rests directly upon glass ring 16. It will be appreciated, of course, that the sealing glass may be deposited on either sealing surface or on both if desired. Further, when suitably supported to prevent marring of the viewing face, the panel and funnel members may be arranged in upright position rather than inverted.

The assembly of FIG. 1 may be heated to sealing temperature in any conventional manner as by passing through a lehr or by being placed in a sealing furnace or kiln. The heating means employed must, of course, be such as to provide a suitable heating cycle, that is one permitting removal of organic material if present, fusion and flow of the sealing glass, and subsequent devitrification. Under some circumstances it may also be convenient to combine an evacuation operation with the sealing operation whereby the tube may be exhausted and tipped off after devitrification has occurred to provide a complete tube in one heating cycle.

A completely sealed, composite cathode ray tube 22, formed from the funnel and panel assembly of FIG. 1, is shown in FIG. 2. It will be noted that the ring of sealing glass 16 has been converted into a layer of devitrified sealing glass 24 completely filling the space between surfaces 18 and 20. The thickness of this layer, and hence the amount of sealing glass initially deposited, may vary considerably and is governed largely by the flatness of the sealing surface itself. The tube as shown has no coating or other auxiliary feature either on the panel or within the tube, although the invention is of particular advantage in conjunction with such features. It will be appreciated that they may be present as required or desired and are intentionally omitted here for simplification.

FIG. 3 shows the sealing area of FIG. 2 somewhat enlarged. It will be noted that the sealing glass covers the sealing surfaces, but does not extend up on the wall, and is bowed out slightly on each side. These features characterize what is considered to be a good seal made by flowing a suspension of glass onto the sealing surface.

In the cathode ray tube seal of FIG. 4 panel and funnel sealing surfaces 40 and 42 are covered with U-shaped, metal bands 44 and 46 and a layer of devitrified sealing glass 48 is formed between the opposed surfaces of these metal bands. The metal bands are united with the glass sealing surfaces in a preliminary operation and are provided primarily to facilitate the mounting of other structural members such as shields, masks or grids within the cathode ray tube opening. It will be apparent that the entire funnel could be produced from metal if desired and that in other types of structures preformed ceramic or metal bodies could be employed rather than glass.

FIG. 4 further illustrates a seal made by the dip method. It will be noted that a thin layer of the sealing glass extends up the walls. With the walls beveled, as shown, a smooth arcuate side on the seal is provided with a minimum amount of sealing glass flow. This in turn permits more flexibility in sealing and devitrification temperatures.

It has been observed that prior soft sealing glasses, that is undevitrified glasses, undergo a very large dimensional change, or contraction as they are cooled from the sealing temperature, particularly in the vicinity of the setting point. This tends to set up rather large, non-uniform stresses in the sealing area unless considerable care is taken to maintain a uniform temperature and rate of temperature drop throughout the article being sealed. While this condition is serious in seals of the type illustrated in FIGS. 3 and 4, even greater difficulties have been encountered in the so-called enclosed types of seals where the sealing glass is not open or unenclosed on opposite sides and hence does not have a freedom of movement in at least one direction. The present sealing method is then particularly valuable in producing articles involving seals of this nature.

Figure 5:
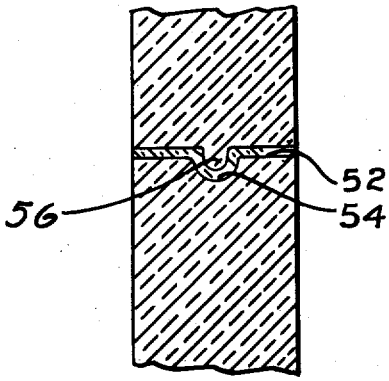

Typical seals of the enclosed type are shown in FIGS. 5, 5a, 6 and 7. FIG. 5 illustrates a tongue and groove type of seal in which one sealing surface 52 has a groove 54, preferably U-shaped within which the soft sealing glass may be deposited and the other sealing surface has a complementary tongue section 56.

Figure 5A:
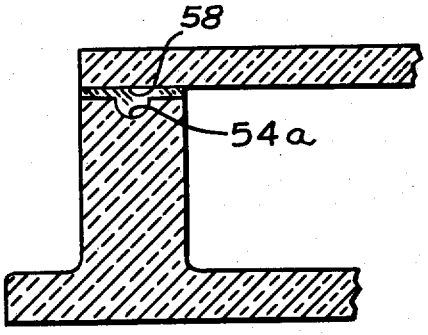

Alternatively as shown in FIG. 5a, a simple groove 54a may be provided for ease in depositing the sealing glass and the opposite sealing surface 58 may be substantially flat. This type of seal is conveniently used where a flat plate is being sealed to a ribbed plate as in the case of a hermetically sealed double pane window construction. In either event the soft sealing glass is confined on three sides by the walls of the groove.

Figure 6:
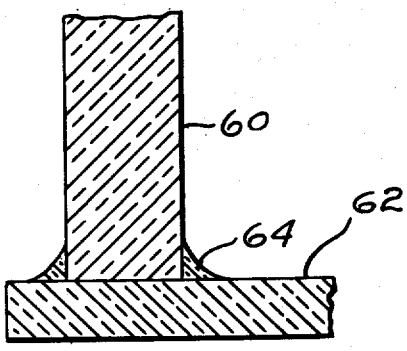

A similar type of sealing condition exists in what is commonly known as a fillet-type seal. A seal of this type is shown in FIG. 6 in which two flat plates 60 and 62 are brought together at right angles and a layer of sealing glass 64 is deposited within the angle formed by the two plates to form a seal which is effectively confined within such angle.

Figure 7:
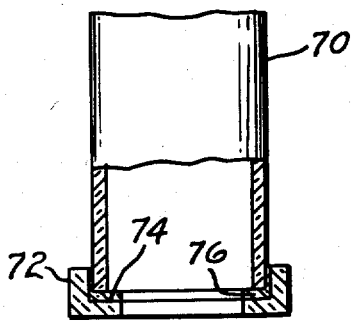

A further type of confined seal occurs in the sealing together of cylindrical members as illustrated in FIG. 7 wherein a cylindrical member 70 is positioned within a slightly larger member 72 having an interior shelf 74 on which the sealing glass 76 is deposited. This type of seal is often used in small electronic devices as an aid in properly aligning the parts during sealing.

Figure 8:
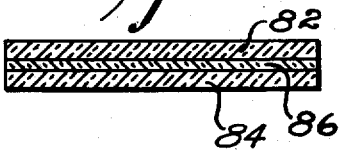

FIG. 8 illustrates a laminated or sandwich type seal wherein the present method has also been found very useful. As shown, opposed faces of flat glass plates 82 and 84 are joined by a layer of devitrified sealing glass 86. It will be appreciated that successive laminations may be made in this manner to form a stack of glass plates and that metal and glass strips may be alternated or otherwise arranged in a stack by this method. Further, this type of seal is a very convenient means of hermetically sealing a cover glass on various types of electrical assemblies.

These general illustrations are by no means intended to be exclusive since it will be readily appreciated that numerous changes in form or shape of seal can be made and that other types of seals may utilize the method. For example, lead wires may be sealed through a glass wall or base and various types of contact devices may be sealed in or through a glass wall or other surface by the present method.

The graph of FIG. 9 illustrates the contrast in thermal expansion or contraction characteristics between glass seals made with devitrified and undevitrified soft sealing glasses. Curves A, B and C on the graph each represent the differential contraction, that is the total or cumulative difference in contraction, between a soft sealing glass and a standard reference glass as a seal between the two glasses is cooled from the sealing temperature to room temperature. The reference glass in the present instance is a standard commercial glass used in manufacturing cathode ray tubes and typical of the glasses described in U.S. Patent No. 2,527,693. The sealing glass employed in obtaining curves A and B is that of Example I in the composition table above and curve A is based on data obtained when this sealing glass was heated to a temperature of approximately 440° C. in contact with the reference glass to form a seal and then cooled before any appreciable devitrification occurred. Curve B on the other hand represents data obtained with an identical seal after it had been held at 450° for a sufficient time to permit substantially complete devitrification to take place in the sealing glass. While the curves are plotted in terms of total contraction differences, and hence should be read from right to left, it will be appreciated that the corresponding expansion curves obtained by reheating the seal differ only slightly due to a minor hysteresis effect and, for present comparative purposes where absolute values are not significant, may be considered as of substantially the same character.

The data used in plotting these curves is obtained by employing unsymmetrical parallel plate seals, such as that illustrated in FIG. 10, and observing birefringence measurements using a suitable polarimeter, such as a Babinet compensator or a Friedel analyzer, while the seal is being thermally cycled between room temperature and the selected sealing temperature. The sample, generally designated 100, is composed of a small strip of ground and polished reference glass 102 on one surface of which is deposited and sealed a small body of sealing glass 104 with the edges of the seal being subsequently cut and polished to facilitate the making of birefringence readings. Such measurements may be plotted directly for comparison purposes as has been done in FIG. 9 or may be converted into either stress or expansion values by formulations well known in the glass art.

When the sealing glass contracts to a greater extent over a selected temperature interval than does the hard reference glass, to which it is sealed, it exerts an inward pull or bending moment on the harder glass at their boundary. This phenomenon is observed and measured in terms of the birefringence effect created and the value so obtained is plotted above the ordinate line as a positive differential contraction. This indicates that, in the seal, the sealing glass is placed in a state of tension with respect to the harder glass being sealed or in other words tensional stresses are developed in the sealing glass. Conversely, when the sealing glass undergoes a smaller total contraction than does the reference glass, the latter exerts a force on the former and a similar, but opposite, birefringence effect is measured. This value then denotes a negative differential contraction and is plotted below the ordinate line. It in turn indicates that, in the seal, the sealing glass is placed in a state of compression or has compressional stresses developed in it. As indicated above, it has been found generally desirable to avoid tensional stress in the sealing glass and to accept a small compressional stress in preference. In fact for some types of seals the latter is considered desirable.

While curves A and B of FIG. 9 are based on data obtained using a specific sealing glass, experience has shown that they embody distinctive features which are characteristics of stable and devitrified sealing glasses in general. Thus following the curves from right to left or in terms of decreasing temperatures, curve A lies on the ordinate line for a span of about 100 degrees since at these temperatures the sealing glass viscosity is too low to permit development of stress within it. In the vicinity of the sealing glass setting point, however, the curve rises very sharply and then levels off. The steep rise in the curve indicates a relatively large contraction in the sealing glass within a small temperature interval and a corresponding development of tensional stresses which appears to be characteristics of stable soft sealing glasses generally. In fact non-devitrifying or stable sealing glasses tend to rise even more sharply, that is undergo an even more severe contraction, as will be seen from curve C which represents a seal made with a typical stable soft sealing glass and is plotted from birefringence data observed in similar manner on such a seal made with the reference glass. While the contraction rate may reverse at lower temperatures, as indicated by curve C, and hence indicate a good expansion match with the reference glass at room temperature, the seal is extremely sensitive to heat shock at the higher temperatures and this appears to be the feature that has created the prior heat shock problems.

On the other hand it will be seen from curve B that when the soft sealing glass of curve A is caused to devitrify, the practical effect is to markedly change its physical properties and particularly to decrease the expansion change over the temperature range of interest. The devitrified material has been rendered sufficiently hard or viscous that it supports stress at the sealing temperature. Furthermore, it tends to contract more slowly than does the reference glass so that the curve falls below the ordinate line thus indicating development of compressional stresses within the sealing material. It will be noted that curve B has a slight upward dip in the neighborhood of about 300°. This appears to be the result of the glassy phase in the devitrified material attempting to undergo its characteristic extreme contraction near its setting point. However, this effect is largely counteracted by the rigidity of the devitrified crystalline phase or skeleton.

It will be appreciated that curves for other devitrified glasses may lie closer to the ordinate line, that is represent less difference in contraction, and may even be above the line in part. However, the character of such curves will generally be similar to that of curve B thus indicating freedom from the sudden change in rate of contraction which is characteristic of non-devitrified glasses.

It is also very helpful in evaluating the present sealing glasses to have a reasonably accurate measurement of the temperature at which devitrification occurs. While this can ordinarily be determined visually, it may be more accurate to make sealing tests which are evaluated as described above.

By way of more specifically illustrating the invention, reference is made to the forming of a devitrified seal between the glass funnel and panel portions of a 22″ rectangular cathode ray tube. The panel and funnel members were molded in conventional manner and their sealing surfaces given a suitable finish. A clear sealing glass, corresponding in composition to Example V of the table above, was melted and the clear glass obtained was crushed and ground to a powder passing through a 100-mesh screen. A vehicle or suspending medium for the powdered glass was prepared by adding 1% by weight of nitro-cellulose, to purified amylacetate. The powdered glass was then stirred into this vehicle with about 8 to 12 grams of glass added per gram of vehicle. The suspension thus formed was deposited on the sealing surface of the funnel by flowing through tubular glass applicator having a constricted tip. The rate of application was adjusted so that a bead of material flowing just to the edges of the sealing surface was applied. The coated funnel was then allowed to dry approximately an hour during which the amylacetate was substantially volatilized leaving a bead of sealing glass having a satisfactory degree of green strength. The funnel was then mounted in inverted position with the panel resting on the soft glass bead in substantially the manner shown in FIG. 1. The assembly was placed in a sealing furnace, heated at a rate of 10° per minute to 275° C., and held for a period of 15 minutes to insure complete burning out of the organic material. The temperature was then raised to 440° C., the sealing temperature, at 10° per minute and held at that temperature for 30 minutes to permit formation of a seal and subsequent devitrification. The assembly was then cooled at a rate of 7½° per minute. *This illustrative sealing cycle is graphically illustrated in FIG. 12 of the accompanying drawing with the various stages of the cycle identified.*

It may be noted that the same materials, prepared in the same manner and mixed in approximately the same proportions, have been used in applying sealing glass by the dipping process described earlier.

As an alternative to the above procedure the sealed bulb was held at 440° C. for 30 minutes, cooled at 7½° per minute to 400° C., held for 15 minutes at this temperature and then evacuated at the same temperature for an additional 30 minutes. Thereafter it was cooled down, still under vacuum, at a rate of 7½° per minute and ultimately let to air when at about 50° C. In each instance a well sealed composite tube resulted.

The improved heat shock resistance provided by the present method is illustrated by the fact that prior to the present invention it was considered impractical to cool seals of the type described above at rates in excess of 2–3 degrees per minute because of the severe breakage encountered.

What is claimed is:

1. The method of joining two preformed bodies having thermal expansion characteristics sufficiently compatible to permit their being fusion sealed with an intermediate sealing material which comprises reducing a [devitrifiable] *semi-stable, lead-zinc-borate* soft sealing glass to a finely divided state, forming a suspension of the finely divided glass, depositing the suspended glass on the sealing surface of at least one of the preformed bodies, assembling the parts in sealing relationship, heating to the sealing temperature, and thereafter [devitrifying] *holding* the sealing glass *at a temperature not below the sealing temperature for a time sufficient to crystallize at least a part of the glass to a relatively rigid crystalline skeleton and thereby produce a material of increased viscosity and changed thermal expansion characteristics substantially corresponding to the crystalline phase.*

[2. The method of claim 1 in which the finely divided glass deposited on the sealing surface is glazed prior to the sealing operation.]

[3. The method of claim 1 in which the finely divided glass deposited on the sealing surface is glazed at a temperature below the subsequent sealing temperature.]

4. The method of claim 1 in which the sealing glass is [devitrified] *held* at the sealing temperature *to effect crystallization.*

5. In the joining together of two bodies by means of a sealing glass wherein the bodies have thermal expansion characteristics sufficiently compatible to permit their being fusion sealed with an intermediate sealing material and wherein after the said bodies have been joined the seal will be exposed to a temperature above the strain point and sufficiently near the softening point of the glass used in making said seal that said glass would tend to flow under pressure, the method which comprises aligning the two bodies with their sealing surfaces in juxtaposition and with a [devitrifiable] *semi-stable, lead-zinc-borate* sealing glass interposed therebetween, heating the sealing glass to a temperature sufficiently above its softening point to cause it to flow and wet said sealing surfaces, and thereafter [devitrifying] *holding* said sealing glass *at a temperature not below the sealing temperature for a time sufficient to crystallize at least a part of the glass to a relatively rigid crystalline skeleton and thereby produce a material of increased viscosity and changed thermal expansion characteristics substantially corresponding to the crystalline phase.*

6. A method of joining preformed bodies having thermal expansion characteristics sufficiently compatible to permit their being fusion sealed with an intermediate sealing material which comprises forming a fused glass seal between the bodies with a [devitrifiable] *semi-stable, lead-zinc-borate* sealing glass and thereafter [devitrifying] *holding* the fused sealing glass *at a temperature not*

*below the sealing temperature for a time sufficient to crystallize at least a part of the glass to a relatively rigid crystalline skeleton and thereby produce a material of increased viscosity and changed thermal expansion characteristics substantially corresponding to the crystalline phase.*

[7. A method in accordance with claim 6 in which the sealing glass is devitrified by thermal treatment at a temperature at least as high as that temperature at which the fused glass seal is formed.]

[8. A method in accordance with claim 6 in which the temperature at which the fused glass seal is formed is at least 40° above the softening point of the sealing glass.]

9. A method in accordance with claim 6 in which the sealing glass is [devitrified by thermal treatment] *crystallized by holding* at the temperature at which the fused glass seal is formed.

10. A method in accordance with claim 6 in which the step of [devitrifying] *crystallizing* the sealing glass is performed within a period of time not exceeding one hour.

11. A composite article comprising preformed bodies and a layer of sealing material between the bodies and integrally adherent to their surfaces, said sealing material being composed of a [devitrified glass] *lead-zinc-borate sealing glass at least partially crystallized to a relatively rigid crystalline skeleton, having increased viscosity characteristics substantially corresponding to the crystalline phase, and* having thermal expansion characteristics compatible with those of each preformed body and formed by in situ [devitrification] *crystallization.*

[12. An article in accordance with claim 11 in which at least one of the preformed bodies is composed of glass.]

[13. An article in accordance with claim 11 in which at least one of the preformed bodies is composed of metal.]

[14. An article in accordance with claim 11 in which at least one of the preformed bodies is composed of ceramic.]

15. A cathode ray tube comprising a panel and funnel and a layer of sealing material between the bodies and integrally adherent to their surfaces, said sealing material being composed of a [devitrified glass] *lead-zinc-borate sealing glass at least partially crystallized to a relatively rigid crystalline skeleton, having increased viscosity characteristics substantially corresponding to the crystalline phase, and* having thermal expansion characteristics compatible with those of each preformed body and formed by in situ [devitrification] *crystallization.*

[16. A cathode ray tube comprising a glass panel and funnel having metal bands forming the sealing surfaces thereof and a layer of devitrified sealing glass joining together the metal bands said layer of devitrified sealing glass having thermal expansion characteristics compatible with those of the metal bands and being formed by in situ devitrification.]

*17. A composite article comprising at least one preformed body and a layer of sealing material integrally adherent to the surface of the body, said sealing material being composed of a lead-zinc-borate sealing glass at least partially crystallized to a relatively rigid crystalline skeleton, having increased viscosity characteristics substantially corresponding to the crystalline phase, and having thermal expansion characteristics compatible with those of the preformed body and formed by in situ crystallization.*

*18. A method of producing a composite article including at least one preformed body which comprises*

*forming a fused glass seal on the surface of the preformed body with a semi-stable lead-zinc-borate sealing glass,*

*and thereafter holding the sealing glass at a temperature not below the sealing temperature for a time sufficient to crystallize at least a part of the glass to a relatively rigid crystalline skeleton and thereby produce a material of increased viscosity and changed thermal expansion characteristics substantially corresponding to the crystalline phase.*

*19. A method of forming a fusion seal between at least one preformed surface and a material having thermal expansion characteristics sufficiently compatible therewith to adhere thereto which comprises*

*reducing a semi-stable lead-zinc-borate soft sealing glass to a finely divided state,*

*forming a suspension of the finely divided glass,*

*depositing the suspended glass on the preformed surface,*

*heating the assembly to the sealing temperature to form a fused glass seal on the surface of the preformed body*

*and thereafter holding the sealing glass at a temperature not below the sealing temperature for a time sufficient to crystallize at least a part of the glass to a relatively rigid crystalline skeleton and thereby produce a material of increased viscosity and changed thermal expansion characteristics substantially corresponding to the crystalline phase.*

*20. The method of joining two preformed bodies having thermal expansion characteristics sufficiently compatible to permit their being fusion sealed with an intermediate sealing material which comprises reducing a semi-stable soft sealing glass to a finely divided state, forming a suspension of the finely divided glass, depositing the suspended glass on the sealing surface of at least one of the preformed bodies, assembling the parts in sealing relationship, heating to the sealing temperature, and thereafter holding the sealing glass at a temperature not below the sealing temperature for a time sufficient to crystallize at least a part of the glass to a relatively rigid crystalline skeleton and thereby produce a material of increased viscosity and changed thermal expansion characteristics substantially corresponding to the crystalline phase.*

*21. The method of claim 20 in which the sealing glass is held at the sealing temperature to effect crystallization.*

*22. A method of joining preformed bodies having thermal expansion characteristics sufficiently compatible to permit their being fusion sealed with an intermediate sealing material which comprises forming a fused glass seal between the bodies with a semi-stable sealing glass and thereafter holding the fused sealing glass at a temperature not below the sealing temperature for a time sufficient to crystallize at least a part of the glass to a relatively rigid crystalline skeleton and thereby produce a material of increased viscosity and changed thermal expansion characteristics substantially corresponding to the crystalline phase.*

*23. A method in accordance with claim 22 in which the sealing glass is crystallized by holding at the temperature at which the fused glass seal is formed.*

*24. A method in accordance with claim 22 in which the step of crystallizing the sealing glass is performed within a period of time not exceeding one hour.*

*25. A composite article comprising preformed bodies and a layer of sealing material between the bodies and integrally adherent to their surfaces, said sealing material being composed of a sealing glass at least partially crystallized to a relatively rigid crystalline skeleton, having increased viscosity characteristics substantially corresponding to the crystalline phase, and having thermal expansion characteristics compatible with those of each preformed body and formed by in situ crystallization.*

*26. A cathode ray tube comprising a panel and funnel and a layer of sealing material between the bodies and integrally adherent to their surfaces, said sealing material being composed of a sealing glass at least partially crystallized to a relatively rigid crystalline skeleton, having increased viscosity characteristics substantially corresponding to the crystalline phase, and having thermal expansion characteristics compatible with those of each preformed body and formed by in situ crystallization.*

*27. A method of producing a composite article including at least one preformed body which comprises*

*forming a fused glass seal between the surface of the preformed body and a semi-stable sealing glass,*

*and thereafter holding the sealing glass at a temperature not below the sealing temperature for a time sufficient to crystallize at least a part of the glass to a relatively rigid crystalline skeleton and thereby produce a material of increased viscosity and changed thermal expansion characteristics substantially corresponding to the crystalline phase.*

*28. A method of forming a fusion seal between at least one preformed surface and a material having thermal expansion characteristics sufficiently compatible therewith to adhere thereto which comprises*

*reducing a semi-stable soft sealing glass to a finely divided state,*

*forming a suspension of the finely divided glass,*

*depositing the suspended glass on the preformed surface,*

*heating the assembly to the sealing temperature to form a fused glass seal on the surface of the preformed body*

*and thereafter holding the sealing glass at a temperature not below the sealing temperature for a time sufficient to crystallize at least a part of the glass to a relatively rigid crystalline skeleton and thereby produce a material of increased viscosity and changed thermal expansion characteristics substantially corresponding to the crystalline phase.*

*29. A composite article comprising at least one preformed body and a layer of sealing material integrally adherent to the surface of the body, said sealing material being composed of a sealing glass at least partially crystallized to a relatively rigid crystalline skeleton, having increased viscosity characteristics substantially corresponding to the crystalline phase, and having thermal expansion characteristics compatible with those of the preformed body and formed by in situ crystallization.*

References Cited by the Examiner

The following references cited by the Examiner, are of record in the patented file of this patent or the original patent.

UNITED STATES PATENTS

| | | | |
|---|---|---|---|
| Re. 7,900 | 10/77 | Quinby et al. | 117—40 |
| 1,814,012 | 7/31 | Taft | 65—33 |
| 2,113,818 | 4/38 | Sullivan | 106—61 |
| 2,132,390 | 10/38 | Blau | 65—69 X |
| 2,279,168 | 4/42 | Kalisher et al. | |
| 2,629,093 | 2/53 | Pask et al. | 65—43 X |
| 2,643,020 | 6/53 | Dalton | 65—58 X |
| 2,663,658 | 12/53 | Schurecht | 117—70 |
| 2,691,855 | 10/54 | Armistead | 138—141 |
| 2,859,794 | 11/58 | Barr | 65—60 X |
| 2,876,120 | 3/59 | Machlan | 106—47 |
| 2,894,359 | 7/59 | Pawlickie | 65—43 X |

FOREIGN PATENTS

| | | |
|---|---|---|
| 634,548 | 3/50 | Great Britain. |

OTHER REFERENCES

"Phase Diagrams for Ceramists," by Levin, McMurdie & Hall, pub. by The American Ceramic Society, Columbus, Ohio, 1956, pp. 5 to 14 and 59, also p. 34.

"Handbook of Glass Manufacture," volume II, by Fay V. Tooley, pub. by Ogden Publishing Co. 55 W. 42nd St., New York 36, N.Y., 1960, pp. 187 to 199.

DONALL H. SYLVESTER, *Primary Examiner.*

ARTHUH P. KENT, JAMES S. BAILEY, MORRIS O. WOLK, *Examiners.*